(12) United States Patent
Huang et al.

(10) Patent No.: US 8,950,725 B2
(45) Date of Patent: Feb. 10, 2015

(54) FRAME STAND FOR A DISPLAY PANEL

(71) Applicant: Syncmold Enterprise Corp., New Taipei (TW)

(72) Inventors: Wei-Yi Huang, Taipei (TW); Chunh-Siang Tsai, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 63 days.

(21) Appl. No.: 13/837,393

(22) Filed: Mar. 15, 2013

(65) Prior Publication Data

US 2014/0175253 A1 Jun. 26, 2014

(30) Foreign Application Priority Data

Dec. 26, 2012 (TW) .............................. 101150089 A (51) Int. Cl.
*F16M 13/00* (2006.01)
*F16M 11/10* (2006.01)
*F16M 11/20* (2006.01)
*F16M 13/02* (2006.01)

(52) U.S. Cl.
CPC .............. *F16M 13/00* (2013.01); *F16M 11/105* (2013.01); *F16M 11/2021* (2013.01); *F16M 13/022* (2013.01); *F16M 2200/044* (2013.01); *Y10S 248/917* (2013.01); *Y10S 248/921* (2013.01)
USPC ........... 248/558; 248/121; 248/917; 248/921; 248/445; 361/679.21

(58) Field of Classification Search
CPC ......... F16M 13/00; F16M 13/02; F16M 7/00; F16M 11/04; F16M 11/14; F16M 11/10; F16M 11/12; H04M 1/0293; A47B 23/04; G06F 1/1616; G06F 1/1679; G06F 1/162; G06F 1/1681
USPC ................. 248/558, 445–447, 454, 455, 458, 248/917–923, 371, 276.1, 278.1, 284.1; 361/679.22, 679.06, 679.21
See application file for complete search history.

(56) References Cited

U.S. PATENT DOCUMENTS

| | | | | |
|---|---|---|---|---|
| 6,698,063 B2 * | 3/2004 | Kim et al. | | 16/337 |
| 7,478,789 B2 * | 1/2009 | Yukawa et al. | | 248/371 |
| 7,652,873 B2 * | 1/2010 | Lee | | 361/679.06 |
| 7,681,845 B1 * | 3/2010 | Chang | | 248/161 |
| 7,735,797 B2 * | 6/2010 | Hu | | 248/371 |
| 8,201,791 B2 * | 6/2012 | Zhang et al. | | 248/278.1 |
| 8,226,054 B2 * | 7/2012 | Chen et al. | | 248/127 |
| 8,266,834 B2 * | 9/2012 | Chen et al. | | 40/749 |
| 2005/0247832 A1 * | 11/2005 | Cho et al. | | 248/133 |
| 2008/0192417 A1 * | 8/2008 | Hwang et al. | | 361/681 |

(Continued)

*Primary Examiner* — Terrell McKinnon
*Assistant Examiner* — Monica Millner
(74) *Attorney, Agent, or Firm* — Rosenberg, Klein & Lee (57) ABSTRACT

A frame stand includes a board, an interface plate and a supporting rack. The board is mounted on a display panel. The interface plate pivotally connects the board by a first shaft. The interface plate rotates in parallel with respect to the board and form a first rotate angle. The supporting rack connects the interface plate and has a second shaft and a supporting member. The supporting member swings a second angle by using the second shaft as an axis. The second shaft selectively approaches or moves away from a working surface. The frame stand switches between a first state and a second state. In the first state, the supporting member and the first side of display panel rest on the working surface. In the second state, the supporting member and the second side of display panel rest on the working surface.

9 Claims, 11 Drawing Sheets

(56) References Cited

U.S. PATENT DOCUMENTS

| | | | |
|---|---|---|---|
| 2011/0062304 A1* | 3/2011 | Hsieh et al. | 248/372.1 |
| 2011/0279962 A1* | 11/2011 | Chiang et al. | 361/679.21 |
| 2011/0279993 A1* | 11/2011 | Su | 361/807 |
| 2013/0037671 A1* | 2/2013 | Iu et al. | 248/286.1 |

* cited by examiner

FRAME STAND FOR A DISPLAY PANEL

BACKGROUND

1. Field of the Invention

The instant disclosure relates to a supporting device; in particular, to a frame stand.

2. Description of Related Art

Followed by the progress of display panel manufacturing, tablet displays become popular. In addition, touch control technique is well developed and incorporated with display panels.

The motion sensors, for example, gyroscopes and accelerometer of micro electro mechanical systems (MEMS), are used in the touch control panel to provide a flawless operation. The motion sensors detect any rotation or tilting of the panel and provide associated signals for mode switching. If the touch control panel is too large to be handheld, a supporting device on the back of the touch control panel can be arranged. Thus the supporting device and one side of touch control panel rest on a working surface (for example, a table), and the touch control panel can stand for different viewing angles.

Figure 6:
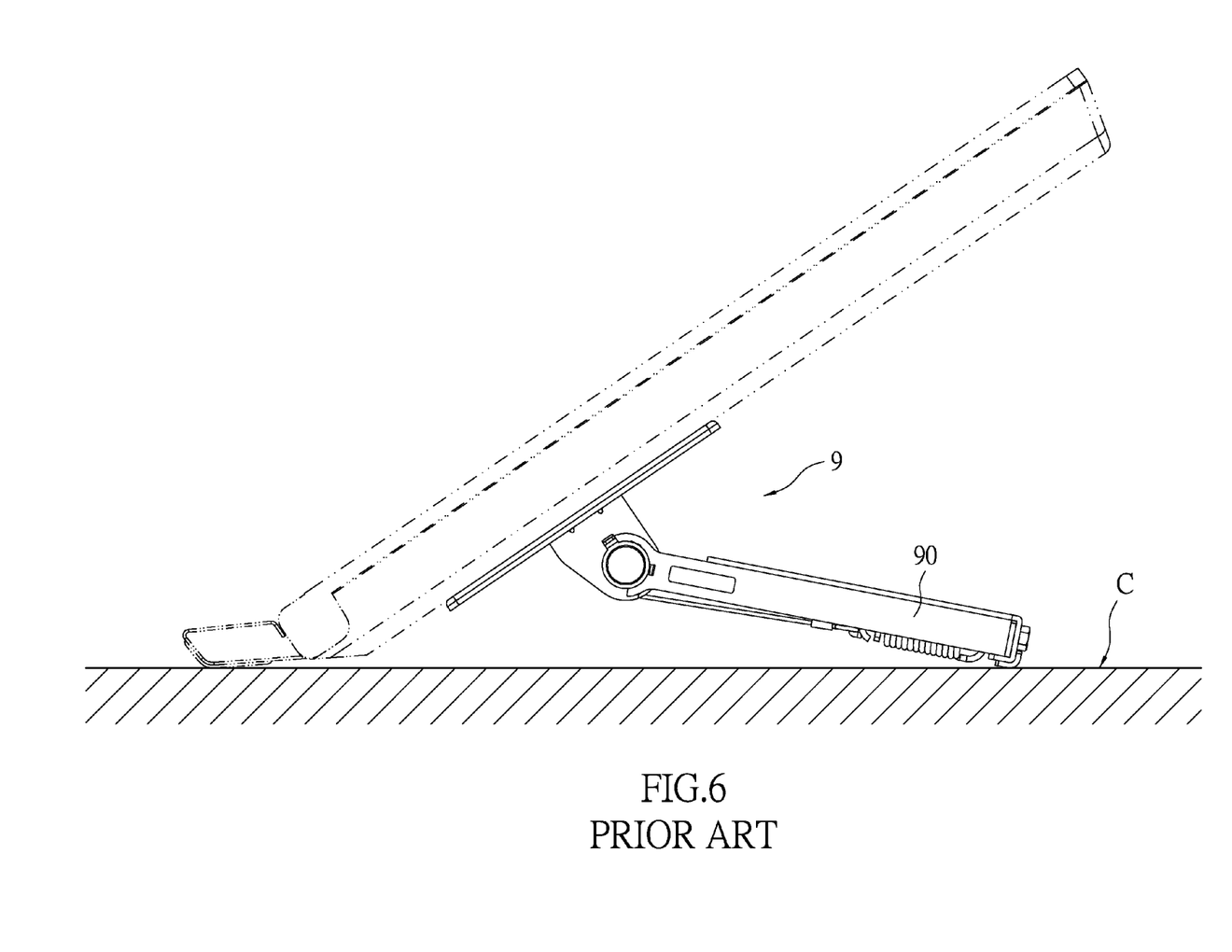
FIG. 6 shows a perspective view of a conventional frame stand for a display panel.

However, as shown in FIG. 6, a frame stand 9 for a conventional display panel, cannot be freely adjusted to a big tilting angle. The frame stand 9 tilts through a return module 90 and the viewing angle can be adjusted accordingly. Nevertheless, the frame stand 9 only allows the display panel for a maximum tilting angle of 60° relative to working surface C.

Furthermore, the orientation of the display panel cannot be changed. So, it is not allowed to switch between landscape and portrait modes.

In addition, a user taps the touch control panel for executing command and the force applied may cause a considerable shock. If the frame stand cannot sustain the shock, a derived shaking may result to higher eye strain.

SUMMARY OF THE INVENTION

The instant disclosure is to provide a frame stand for display panel, resembling a frame-standing display device. The frame stand has two states and the viewing angle is flexibly adjustable.

According to one exemplary embodiment of the instant disclosure, the frame stand is used to support a display panel on a working surface. The frame stand includes a board, a first shaft, an interface plate and a supporting rack. The board is mounted on the back of the display panel. The first shaft connects the board while the interface plate pivotally connects to the board by the first shaft. Thus the interface plate can rotate to a first angle in respect to the board. The supporting rack connects the interface plate and has at least one supporting member and a second shaft coupling to one end of the supporting member. The supporting member can swing by using the second shaft as an axis to a second angle and therefore the distance between the second shaft and the working surface varies. As the second angle increases, the second shaft is closer to the working surface. In contrast, as the second angle decreases, the second shaft is further away from the working surface. The frame stand can switch from a first state to a second state. In the first state, the first side of display panel and the supporting member rest on the working surface. In the second state, the second side of display panel and the supporting member rest on the working surface.

Furthermore, the frame stand includes a guiding groove and a guiding member. The guiding groove is formed on the interface plate. One end of the guiding member connects the board while the other end fits to the guiding groove. When the interface plate rotates to the first angle, the guiding member moves along the guiding groove. In the first state, the guiding member is in a first position within the guiding groove whereas in the second state, the guiding member is in a second position within the guiding groove.

Preferably, the guiding groove is a quarter of an arc.

Preferably, the guiding member is a pin having a first end portion smaller in diameter than a second end portion that fits into the guiding groove.

The supporting rack further includes a returning unit. The returning unit connects the interface plate and pivotally connects the supporting member to provide a return force to the supporting member.

The supporting rack further includes a stop which couples to one side of the supporting member where the supporting member contacts the working surface. The stop enhances the friction when the supporting member rests on the working surface.

Preferably, when the second shaft is at the closest position to the working surface, the stop abuts the working surface to allow the display panel being parallel to the working surface.

The board is disposed biased from the centre of the back of the display panel.

In the first state, the supporting member is co-planar with the first side of the display panel and aligned centrally thereto. In the second state, the supporting member is co-planar with the second side of the display panel and aligned centrally thereto.

Moreover, the frame stand includes an auxiliary board. The auxiliary board is flanked between the board and interface plate and using the first shaft as the axis. The surface of the auxiliary board is formed with slots for depositing lubricants.

In summary, the frame stand uses interface plate and supporting rack in cooperation with the first and second shafts to allow different rotating directions. The guiding unit further confines the rotating angle of the first shaft. The frame stand provides two orientations for supporting display panel. In other words, the supporting rack is able to rotate and collaborate with one side of the display panel for standing up or the other. The frame stand provides two different operation states. Also, the construction is relatively simple and therefore effectively reduces manufacturing cost. The instant disclosure exhibits great value in practice and commercial.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1A:
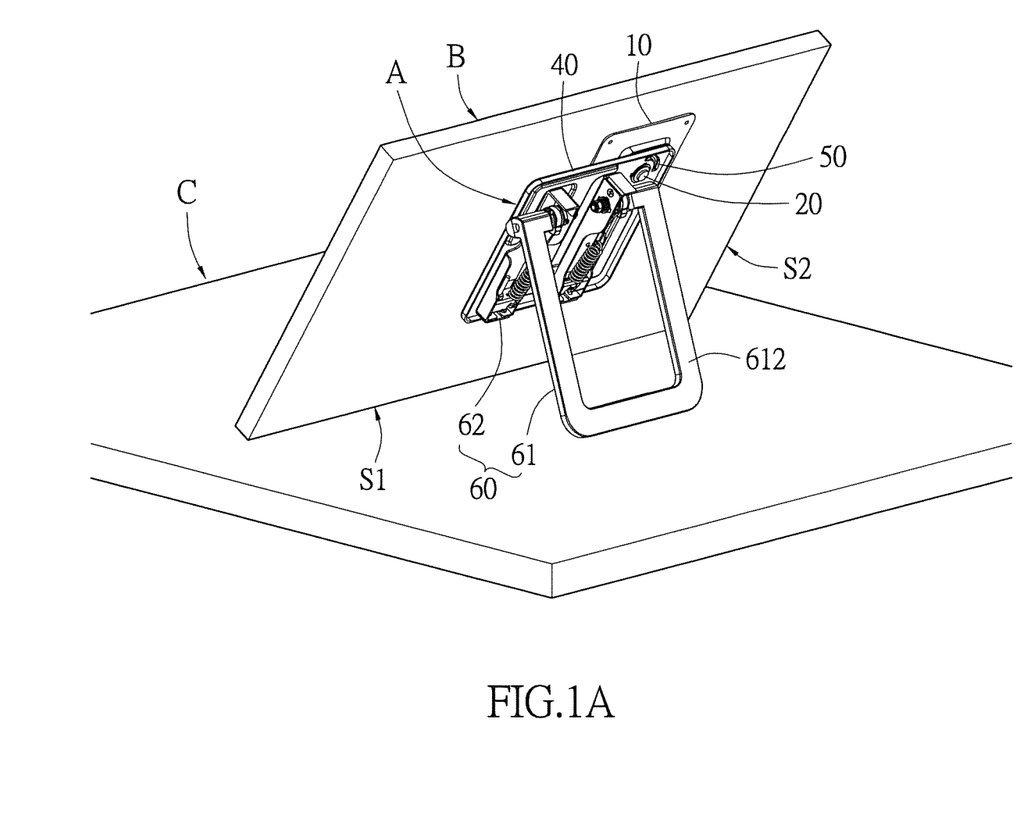
FIG. 1A is a schematic perspective view of a frame stand and a display panel in a first state in accordance with an embodiment of the instant disclosure.
Figure 1B:
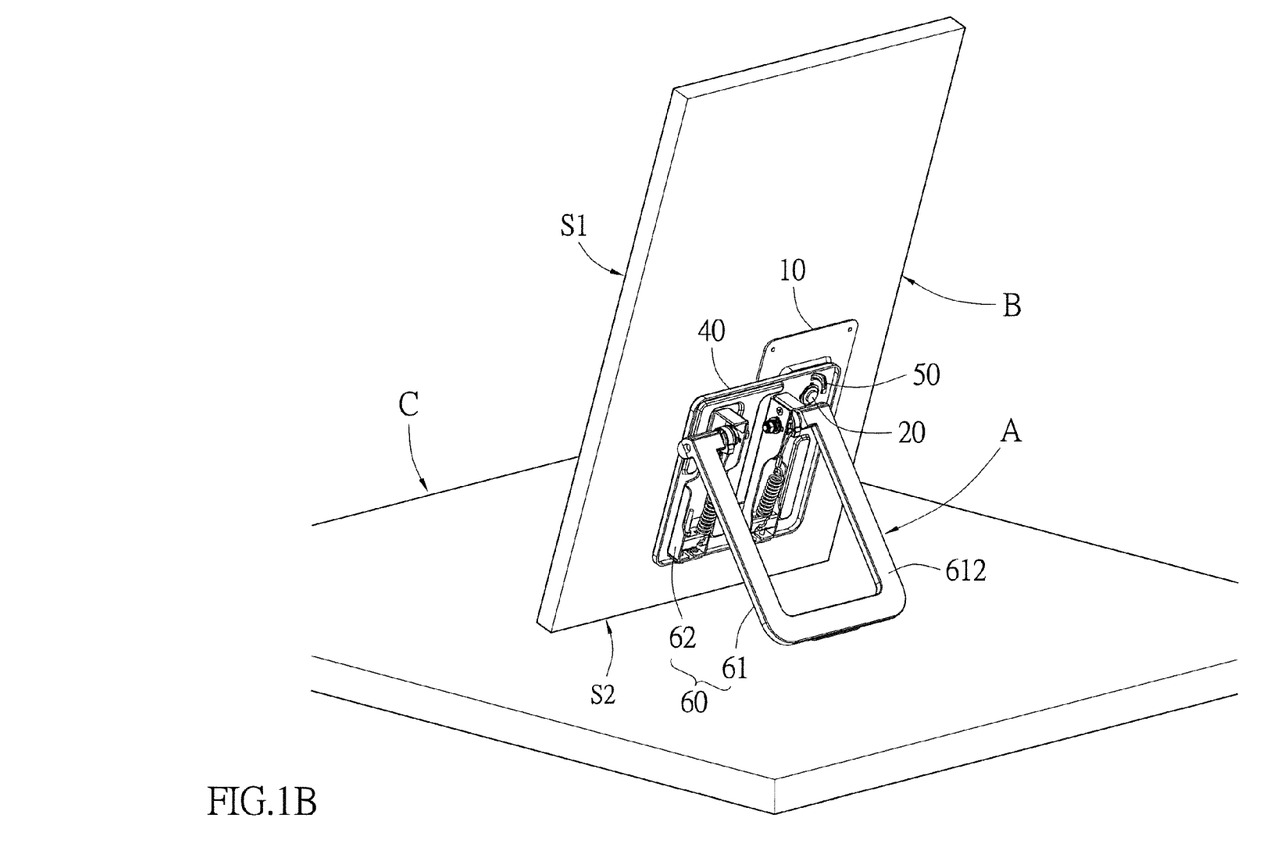
FIG. 1B is a schematic perspective view of a frame stand and a display panel in a second state in accordance with an embodiment of the instant disclosure.

Attention is now invited to FIGS. 1A and 1B. FIG. 1A is a schematic perspective view of a frame stand and a display panel in a first state in accordance with an embodiment of the instant disclosure. FIG. 1B is a schematic perspective view of the frame stand and the display panel in a second state in accordance with the embodiment of the instant disclosure. As shown in FIGS. 1A and 1B, the frame stand A is used to support the display panel B so as to allow the display panel B for steadily standing on a working surface C (for example, a table or ground). The frame stand A and display panel B collectively form a photo frame structure.

Typically, the display panel B is a rectangular tablet with four sides. The display panel B may have different dimensions, for example, 10.1, 12, 17 or 23 inches. In practice, the display panel B can be a liquid crystal display (LCD) device, a LED display device or a touch control panel and the instant disclosure is not limited thereto.

Firstly, the frame stand A, including a supporting rack 60 having a supporting member 612, can be switched between two states. In a first state, a first side S1 of the display panel B and one side of the supporting member 612 rest on the working surface C (as shown in FIG. 1A). In a second state, a second side S2 of the display panel B and another side of the supporting member 612 rest on the working surface C (as shown in FIG. 1B). That is to say, in the first and second states, the display panel B is in a landscape mode and a portrait mode, respectively.

Figure 2A:
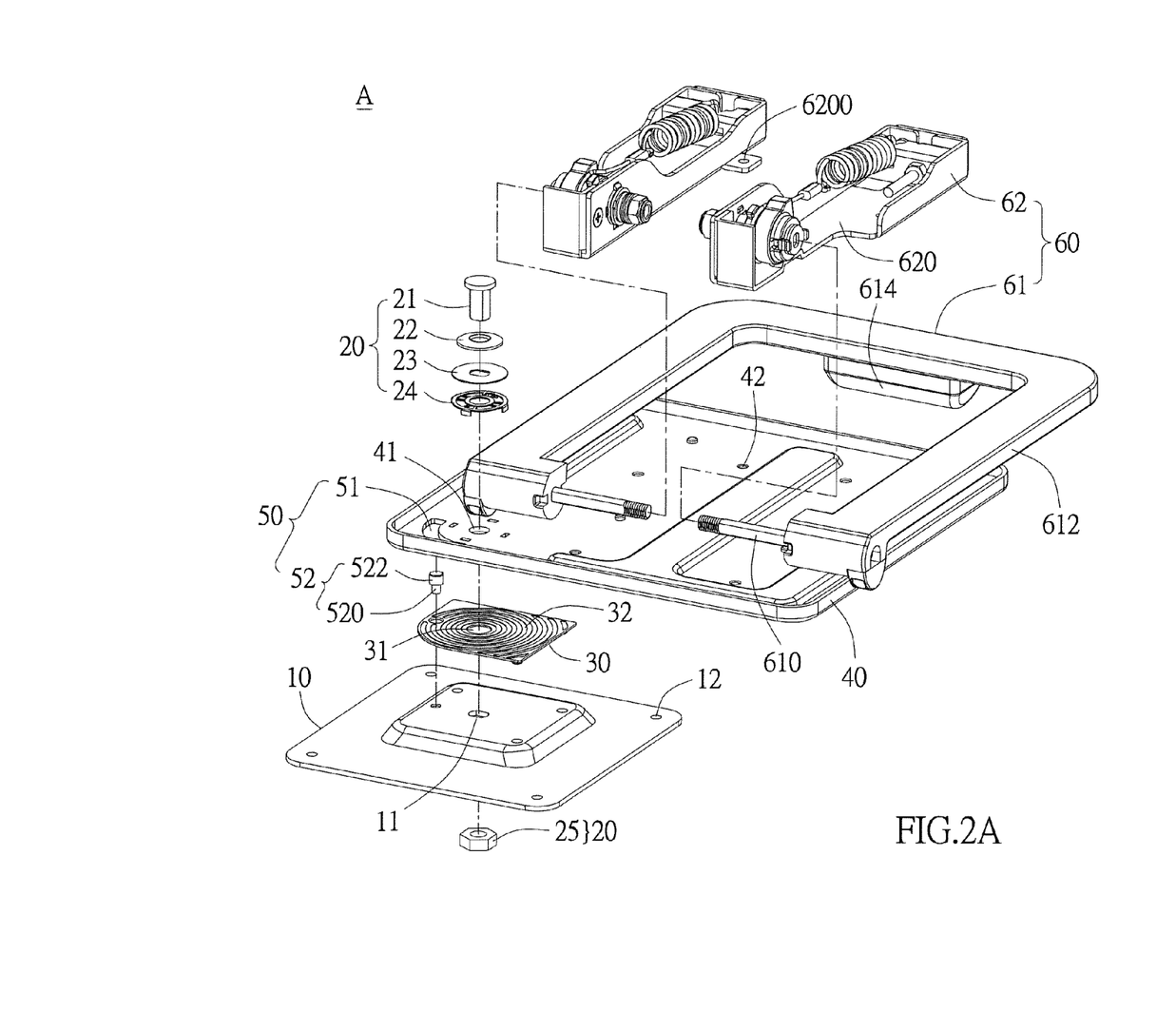
FIG. 2A is a schematic exploded view of a frame stand in accordance with an embodiment of the instant disclosure.

Attention is now invited to FIG. 2A. FIG. 2A is a schematic exploded view of the frame stand in accordance with the embodiment of the instant disclosure. As shown in FIG. 2A, the frame stand A includes a board 10, a first rotating module 20, an auxiliary board 30, an interface plate 40, a guiding unit 50 and a supporting rack 60.

The board 10 mounts on the back of the display panel B. Meanwhile, the board 10 is formed with a through hole 11 at the centre region and a plurality of locking holes 12 at the periphery. A first rotating module 20 goes through the through hole 11 while a plurality of screws (not shown) go through the screw holes 12 for engaging the display panel B and board 10.

The auxiliary board 30 is sandwiched between the board 10 and interface plate 40. The auxiliary board 30 is formed with a through hole 31 at the centre region and formed with slots 32 on the surface contacting the interface plate 40. The first rotating module 20 also goes through the through hole 31. A lubricant is deposited in the slots 32 for reducing friction between the interface plate 40 and auxiliary board 30 upon rotating. In general, the slots 32 are a plurality of circular trenches concentric to the through hole 31. The lubricant is evenly dispersed in the slots 31. However, it should be understood that the slots 32 can be formed into different shapes for intended purpose or completely omitted.

The interface plate 40 is formed with a through hole 41 at a corner thereof. The first rotating module 20 goes through the through hole 41 as well.

The guiding unit 50 has a guiding groove 51 formed on the interface plate 40 and a guiding member 52 being slidable along the guiding groove 51. In the instant embodiment, the guiding member 52 is a pin having a first end portion 520 smaller in diameter than a second end portion 522. The first end portion 520 goes through the auxiliary board 30 and engages with the board 10. In other words, the auxiliary board 30 is tightly secured on the board 10 by the first end portion 520 of the guiding member 52. However, the auxiliary board 30 can be mounted on the board 10 by different engagement means and the instant disclosure is not limited thereto. For example, the auxiliary board 30 can be welded to the board 10. When the interface plate 40 rotates in parallel with respect to the board 10 (and auxiliary board 30), the second end portion 522 of the guiding member 52 travels along the guiding groove 51. That is to say, the guiding groove 52 receives the second end portion 522 of the guiding member 52 and further confines the rotating angle of interface plate 40.

In practice, the guiding member 52 is a substantially round cylinder and the second end portion 522 can smoothly slide within the guiding groove 51. The structure of the guiding member 52 is not limited thereto. In the instant embodiment, the diameter of first end portion 520 is smaller than that of the second end portion 522 but the diameter dimension is not limited thereto.

In addition, in the instant embodiment the guiding groove 51 is an arc taking the through hole 41 of the interface plate 40 as the centre. The corresponding arc angle is approximately 90° and the instant disclosure is not limited thereto.

The first rotating module 20 includes a first shaft 21, resilient gaskets 22, 23, a locking gasket 24 and a nut 25. The first shaft 21 goes through the holes of resilient gaskets 22, 23, locking gasket 24 and the through holes 41, 31, 11 of the interface plate 40, auxiliary board 30 and board 10 in succession. The nut 25 arrests one end of the first shaft 21 and thus the interface plate 40, auxiliary plate 30 and board 10 are collectively secured by the first shaft 21.

The resilient gaskets 22, 23 buffer the force applied to the locking gasket 24 according to the pressure provided by the nut 25. Different twisting forces can be adjusted thereby. The locking gasket 24 serves the job of reducing the friction between the elements. The locking gasket 24 has a plurality of tabs for engaging with the interface plate 40. The instant disclosure is not limited to the number or types of the resilient gaskets shown in the instant embodiment.

It is worth mentioned that the lateral cross-section of the first shaft 21 resembles an ellipsoid. The through hole 11 of the board 10 also resembles an ellipsoid. Hence, the board 10 is in conforming motion with the first shaft 21 as the first shaft 21 rotates. The through hole 41 of the interface plate 40 resembles a circle and thus the interface plate 40 does not follow the rotation led by the first shaft 21. Additionally, although the through hole 31 of the auxiliary board 30 also resembles a circle, the auxiliary board 30 follows the rotation of the board 10 and first shaft 21 because the first end portion 520 of the guiding member 52 secures the auxiliary board 30 on the board 10.

Figure 3A:
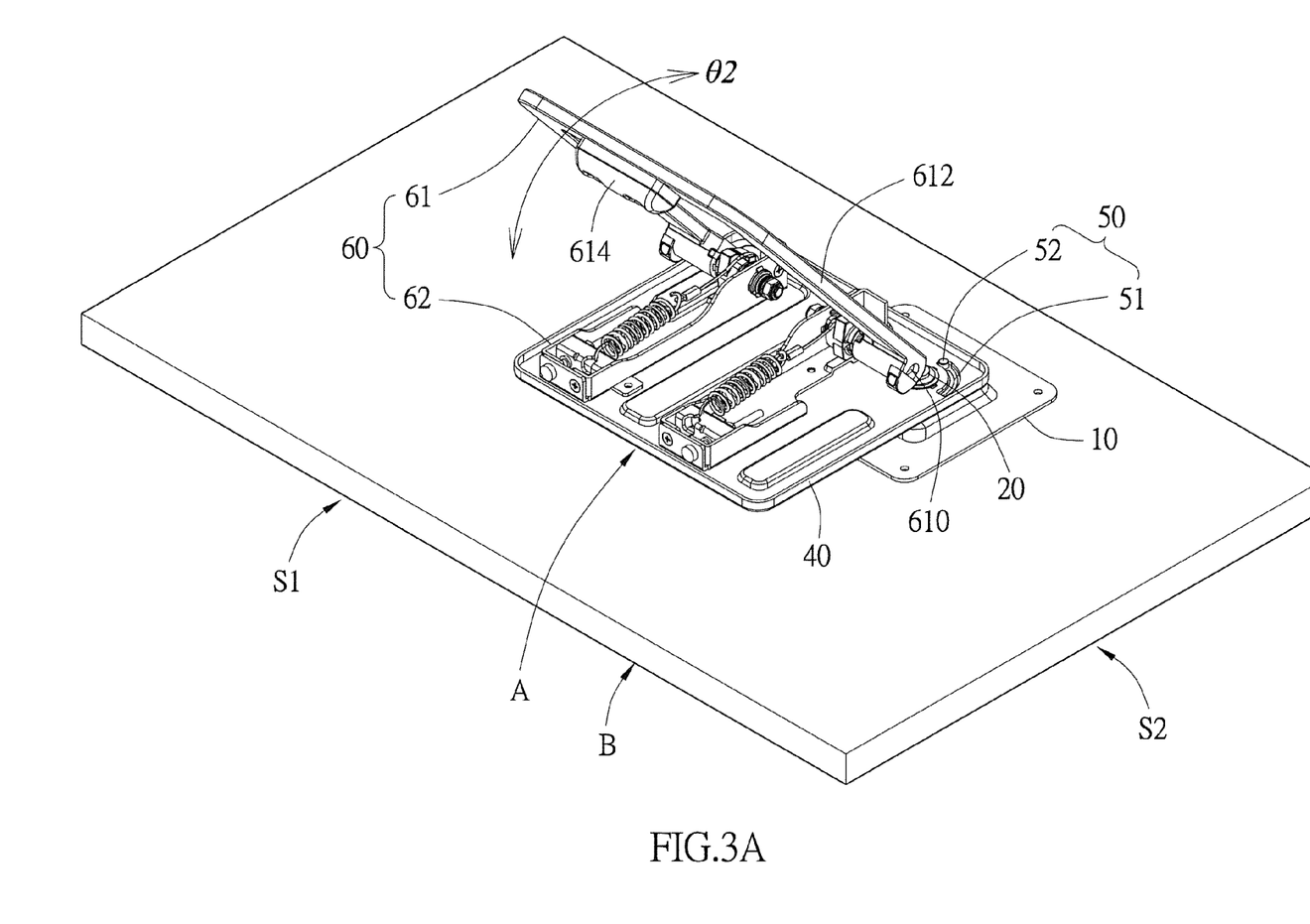
FIG. 3A is another view of FIG. 1A.
Figure 3B:
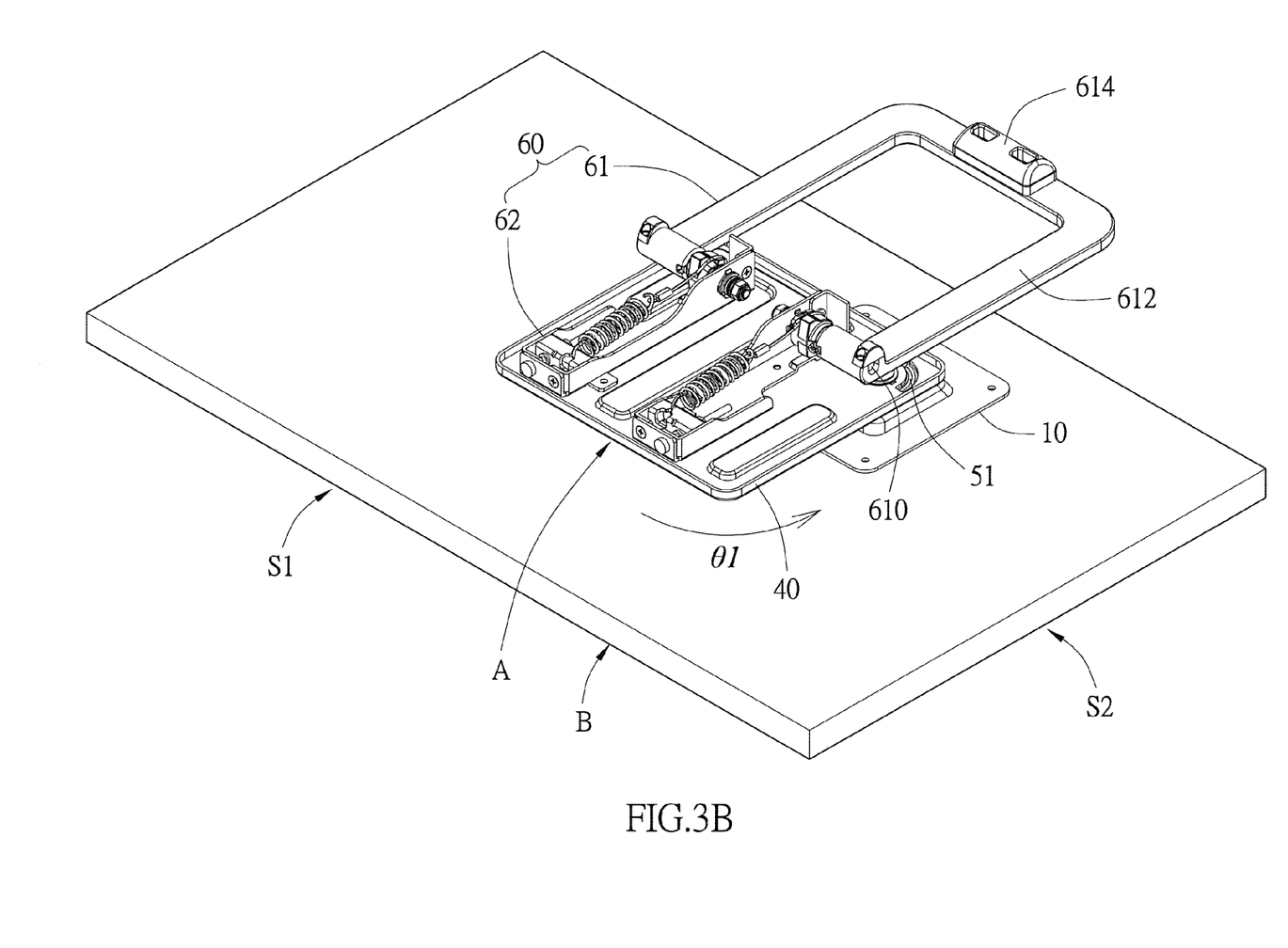
FIGS. 3B and 3C show a frame stand changing states in accordance with an embodiment of the instant disclosure.

The interface plate 40 can be pivotally connected the board 10 (and the auxiliary board 30) by the first rotating module 20. The engagement allows the interface plate 40 for rotating a first angle θ1 relative to the board 10 (and auxiliary board 30), as shown in FIG. 3B. In other words, because the first rotating module 20 pivotally connects the interface plate 40 and board 10 (and auxiliary board 30) and the cross-section design of the through holes 41, 11 (and 31), the interface plate 40 rotates by taking the first rotating module 20 as the axis.

The arc angle of the guiding groove 51 is approximately 90 degree and thus the maximum of the first angle θ1 is 90-degree. In other words, the board 10 can rotate 90 degrees relative to the interface plate 40 to switch the frame stand A between the two aforementioned states.

Figure 2B:
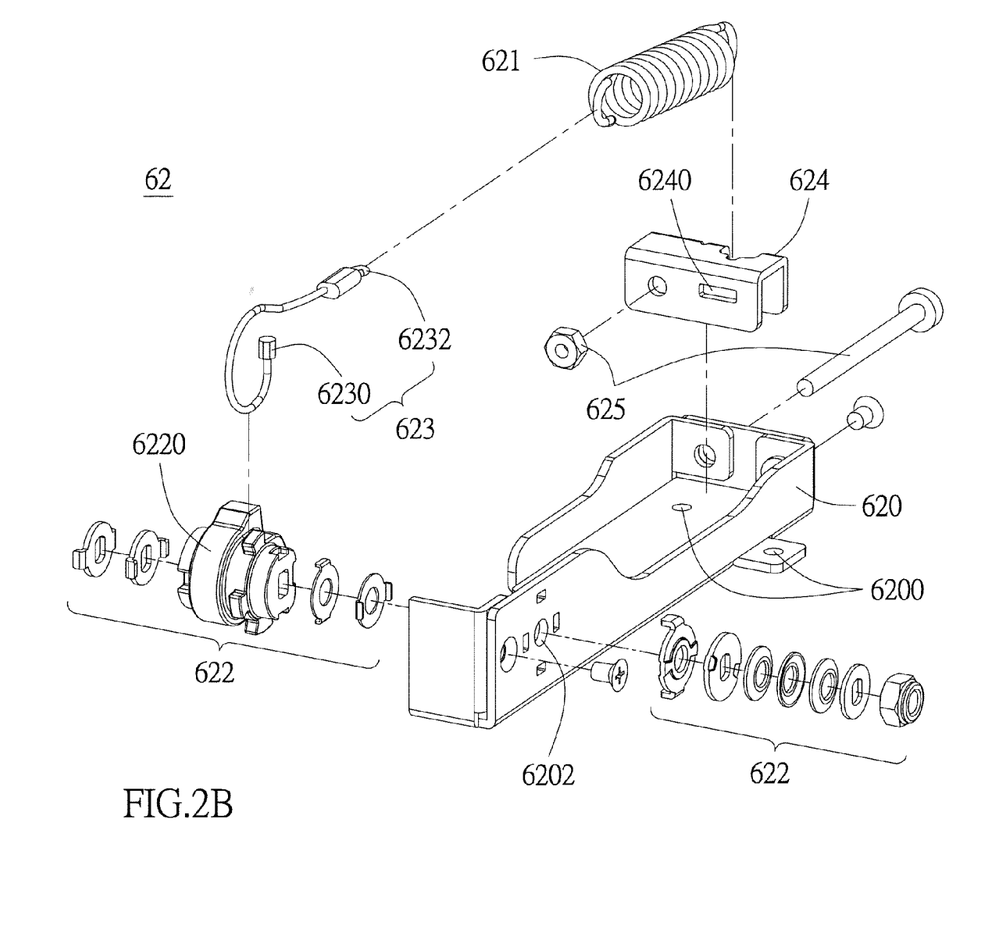
FIG. 2B is a schematic exploded view of a return unit in accordance with an embodiment of the instant disclosure.

Attention is now invited to FIG. 2B. FIG. 2B is a schematic exploded view of a returning unit in accordance with the embodiment of the instant disclosure. In the instant embodiment, the supporting rack 60 includes the supporting unit 61 and a pair of returning units 62. The supporting unit 61 provides a force for the display panel B standing up on the working surface C. The returning unit 62 provides a returning force to the supporting unit 61 relative to the interface board 40. When the supporting unit 61 pivots toward the interface board 40, the returning unit also generates the friction between the supporting unit 61 and the working surface C. The returning, supporting forces, friction and the pressure from the display panel B are in a dynamic balance (as shown in FIG. 1). In short, the supporting unit 61 of the supporting rack 60 can freely open or close to any degree smaller than 180° in respect to the working surface C.

Each of the returning unit 62 has a shell 620 formed with a plurality of locking holes 6200 on the bottom thereof. When the shell 620 superimposes the interface plate 40, the plurality of locking holes 42, 6200 are individually matched as well. Thus screws (not shown) go through the locking holes 42, 6200 to secure the returning unit 62 and the interface plate 40. However, the instant disclosure is not limited to the aforementioned engagement means. For example, the returning unit 62 may be welded to the interface plate 40 or formed integrally. In addition, the number of the returning unit 62 is not restricted in the instant disclosure.

The supporting unit 61 includes a pair of second shaft 610, a supporting member 612 and a stop 614. The supporting member 612 is a U-shaped supporting body. The second shafts 610 are coupled to the end portions of the supporting member 612 respectively. The second shafts 610 are aligned to point each other by the free ends thereof. The stop 614 is arranged on the supporting member 612 where the supporting member 612 contacts the working surface C. The stop 614 is used to provide friction when the supporting member 612 rests on the working surface C. The supporting member 612 can pivot by taking the second shaft 610 as the axis and create a second angle θ2 (as shown in FIG. 3A). Thus, the stop 614 may move toward or away from the interface plate 40. In other words, when the second angle increases, the stop 614 goes further away from the interface plate 40 and therefore the second shaft 610 is closer to the working surface C. In practice, the stop 614 is made of a material having high friction coefficient.

In the instant embodiment, the supporting member 612 resembles a U-shaped structure. However, the supporting member 612 can be H-shaped, "Π"-shaped or L-shaped and the instant disclosure is not limited thereto. Additionally, the structure of the second shafts 610 of the instant disclosure is not restricted by the exemplary embodiment. Alternatively, the supporting member 612 can be a single pin going through both end portions of the supporting member 612 for accomplishing the same purpose.

Moreover, each of the returning units 62 has a shell 620, a resilient unit 621, a hinge 622, a string 623, a holder 624 and a screw set 625. The side of shell 620 is formed with a through hole 6202. The bottom and side portions of the shell 620 define a receiving space for accommodating the other elements. The second shafts 610 go through the through hole 6202 and the hinge 622 is disposed in the shell corresponding to the through hole 6202. Hence, the second shafts 610 go through both the through hole 6202 and the hinge 622.

More specifically, the hinge 622 has a ring 6220. The ring 6220 is formed with an axial hole (no corresponding symbol number) conforming to the lateral cross-section of the second shafts 610. Thus the ring 6220 sleeves the second shafts 610. That is to say, when the supporting member 612 pivots along the second shafts 610, the ring 6220 is simultaneously led to rotate.

The string 623 has a first end 6230 eccentrically coupled to the hinge 622 and a second end 6232 connecting to one end of the resilient member 621. The middle portion of the string 623 winds the circumferential portion of the hinge 622. More specifically, when the second shafts 610 rotate, the ring 6220 is brought to rotation as well. Subsequently, a force is generated by the tension between the string 623 and the ring 6220. Consequently the resilient member 621 deforms according to the tension strength. In other words, the string 623 converts the degree of rotating angle to the deformation of the resilient member 621. In practice, the string 623 can be a string made of steel, iron, copper or alloy and the instant disclosure is not limited thereto.

The holder 624 is disposed in the shell 620 and secured by the screw set 625. The holder 624 has a retaining portion 6240 for receiving one end of the resilient member 621. Specifically, the screw set 625 goes through the shell 620 and engages the holder 624 thereto. The level of combining strength between the holder 624 and screw set 625 can also be adjusted. The strength between the holder 624 and screw set 625 affects the distance between the holder 624 and the second shafts 610. Accordingly, the amount of deformation of the resilient member 621 may also be adjusted in advance. More specifically, when the holder 624 is disposed further away form the second shaft 610, the amount of deformation of the resilient member 621 is greater. That is to say, the resilient member 621 can provide a greater torque in the operation. In practice, the resilient member 621 can be a spring and the instant disclosure is not limited thereto.

Furthermore, the hinge 622 has a set of locking gasket and a set of resilient gasket (both not labeled). The locking gaskets and the resilient gaskets are known to a person skill in the art and therefore further discussion is omitted herein.

In practice, a cover (not shown) will be put over the interface plate 40 and returning unit 62for protection. The cover does not affect the operation of the first shaft 21 and second shaft 610.

Figure 3C:
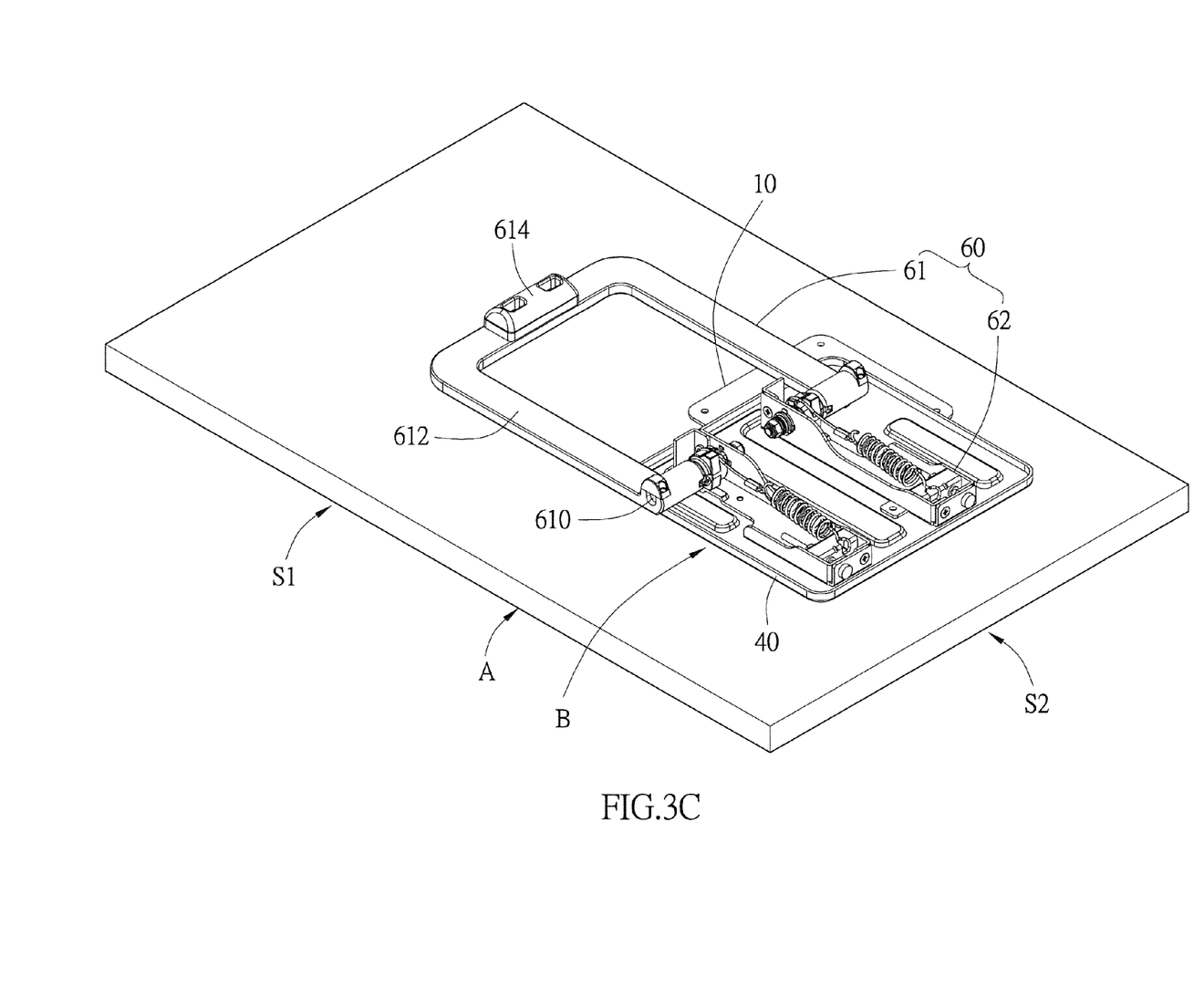
Figure 3D:
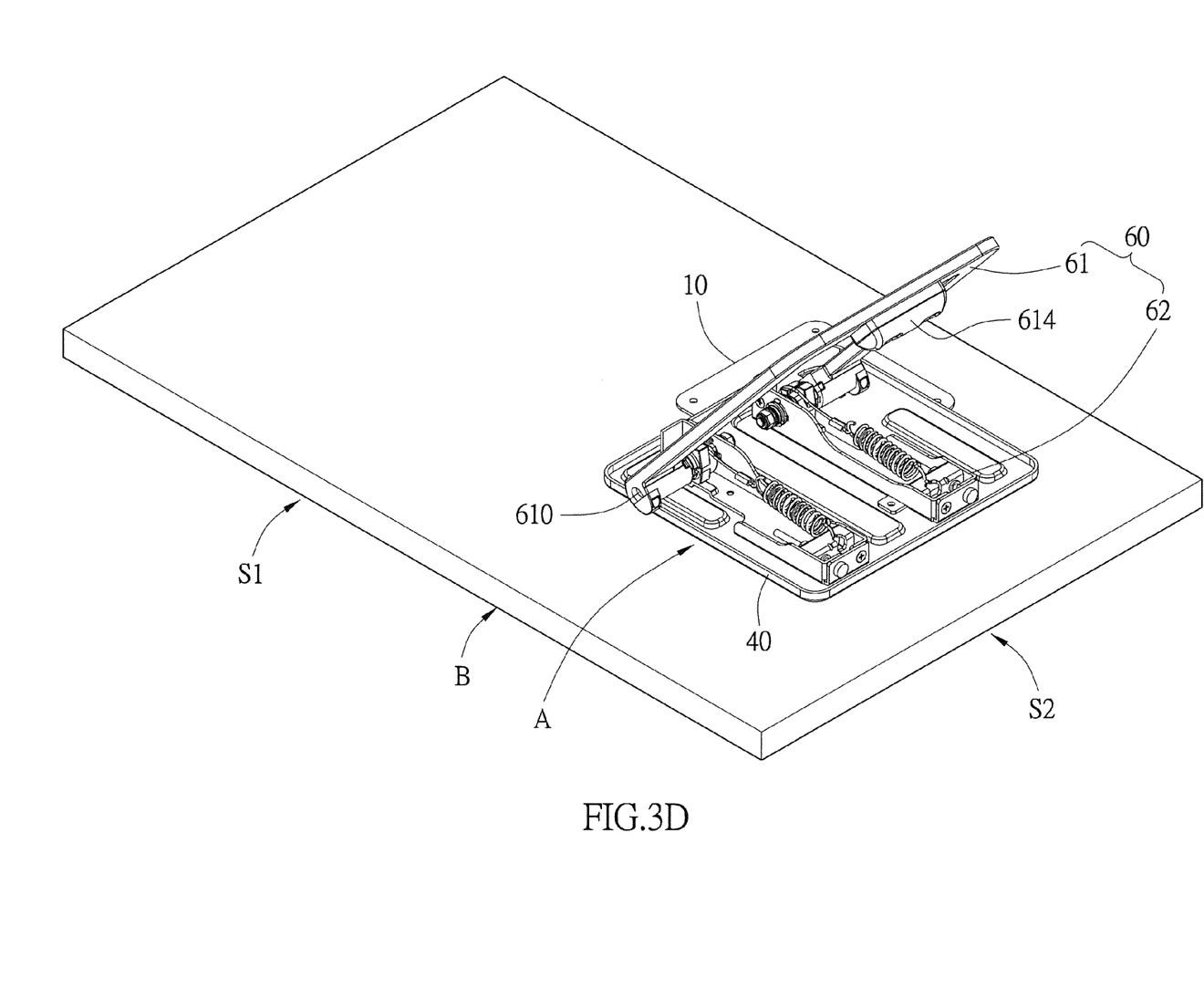
FIG. 3D is another view of FIG. 1B.

Attention is now invited to FIGS. 3A to 3D. FIG. 3A is another view of FIG. 1A. FIGS. 3B and 3C show the frame stand changing states in accordance with the embodiment of the instant disclosure. FIG. 3D is another view of FIG. 1B.

As shown in FIGS. 1A and 3A, when the frame stand A is in the first state, the supporting unit 61 of the supporting rack 60 and the first side S1 of the display panel B rest on the working surface C. In other words, the supporting unit 61 pivots the second angle θ2 with respect to the interface plate 40. Hence, the display panel B along with the frame stand A steadily stands on the working surface C.

Figure 4:
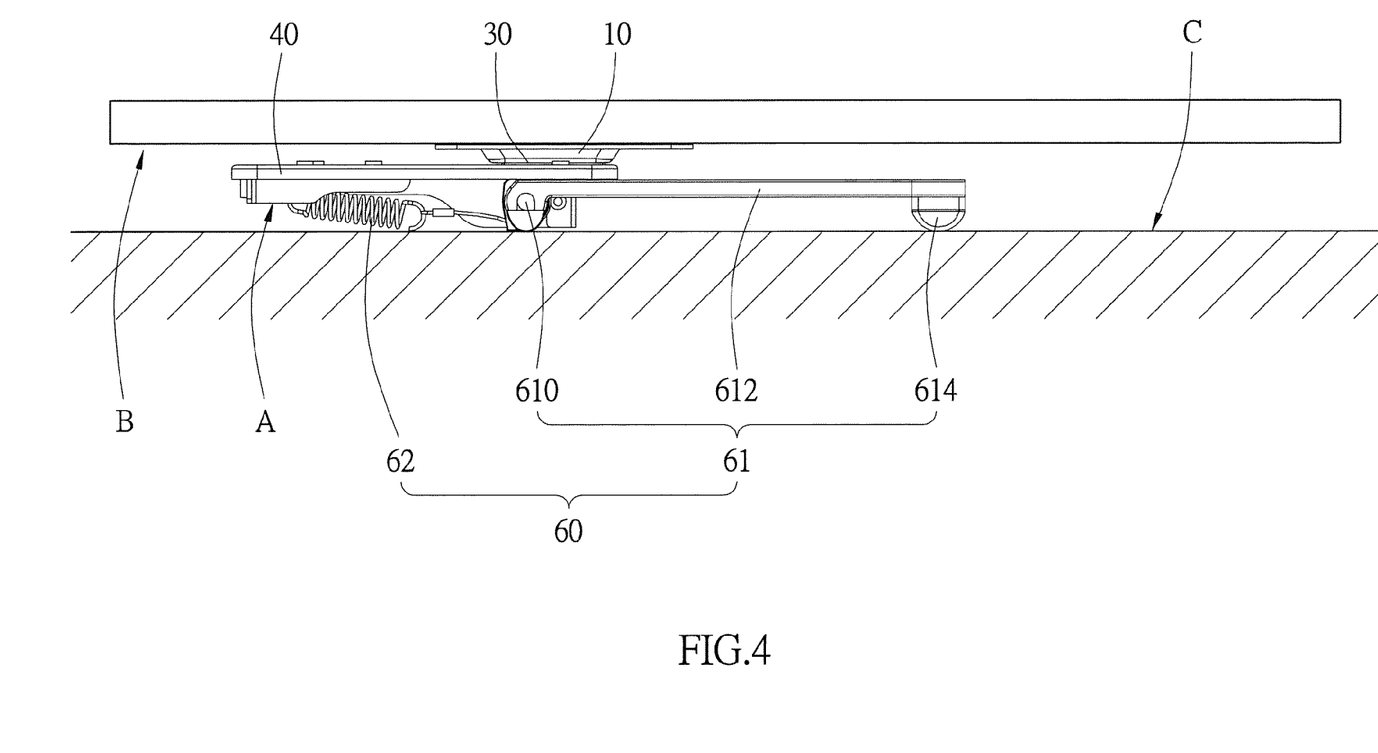
FIG. 4 is a side schematic view of FIG. 3C.

If the frame stand A is switched from the first state to the second state, for a smooth operation, the supporting member 612 is pivoted with the second angle θ2 expanding to the maximum of 180 degree firstly as shown in FIG. 3B. Note that the display panel B should be on the top as shown in FIG. 4 in practice, while FIG. 3B is intended to show the mechanism in a upside down view.

The stop 614 lays on the working surface C and provides friction for temporarily fixing the supporting unit 60 and the interface plate 40 thereon. Subsequently, the board 10 is able to rotate with respect to the temporarily fixed interface plate 40. Meanwhile, the guiding member 52 of the guiding unit 50 slides within the guiding groove 51, from one end to the other, as shown in FIG. 3C. Additionally, because the guiding groove 51 is a quarter-circular arc, the first angle θ1 of the interface plate 40 draws a 90-degree angle upon switching.

Finally, as shown in FIG. 3D, because the returning unit 62 provides a returning force and a user lifts the display panel B, the supporting member 612 (or the stop 614) pivots toward the returning unit 62 by taking the second shaft 610 as the axis. The stop 614 of the supporting unit 61 moves closer to the interface plate 40 as well. The stop 614 further provides friction which maintains the second angle θ2 to a working angle. Hence, the supporting member 612 of the supporting rack 60 and the second side S2 of the display panel B stably rest on the working surface C in the second state as shown in FIG. 1B.

That is to say, when the second end portion 522 of the guiding member 52 is at a first position within the guiding groove 51 (i.e. one end of the guiding groove 51), the first side S1 of the display panel B and the supporting member 612 rest on the working surface C. On the other hand, when the second end portion 522 of the guiding member 52 is at a second position within the guiding groove 51 (i.e. the other end of the guiding groove 51), the second side S2 of the display panel B and the supporting member 612 rest on the working surface C.

Similarly, when the frame stand A switches states from the second to first, the mechanism follows a series of actions starting from FIG. 3D, FIG. 3C, FIG. 3B to FIG. 3A in succession. The mechanism is not repeated herein.

It is worth mentioned that in the instant embodiment, the relative position and dimension of each element depends on the size of display panel B. In the first state, the first side S1 of the display panel B and the supporting member 612 rest on the working surface C. The supporting member 612 is aligned centrally and trimmingly to the first side S1. As long as the frame stand A switches to the second state, the second side S2 of the display panel B and the supporting member 612 rest on the working surface C. The supporting member 612 is aligned centrally and trimmingly to the second side S2. That is to say, in either first or second states, the projection of the center of the supporting member 612 on the display panel B falls on the perpendicular bisector of the corresponding first side S1 or second side S2.

Furthermore, when the frame stand A is in the state shown in either FIG. 3B or 3C, the stop 614 of the supporting unit 61 contacts the working surface C and thus provides sufficient friction and supporting force to the frame stand A as shown in FIG. 4. FIG. 4 is a side schematic view of FIG. 3C. The second angle θ2 of the supporting rack 60 is at 180-degree and the second shaft 610 is at the closest position to the working surface C, namely, the lowest level. The display panel B is in parallel to the supporting member 612 and the working surface C.

Further still, a cover may couple to the back of display panel B for a more steady support. When the second angle θ2 of the supporting rack 60 reaches 180 degrees, the cover contacts the working surface C and supports the display panel B from behind. The addition of the cover reduces any wobbling of the display panel B caused by insufficient supporting. However, the cover structure of the display panel B is not limited herein.

In operation, if the state of the frame stand A is to be altered, a force should be applied to push the display panel B toward the working surface C. The supporting rack 60 is affected by the downward force and the second shaft 610 of the supporting unit 61 approaches the working surface C accordingly. When the second angle θ2 reaches 180 degrees, the stop 614 of the supporting unit 61 provides sufficient friction and supporting as shown in FIG. 4.

Figure 5:
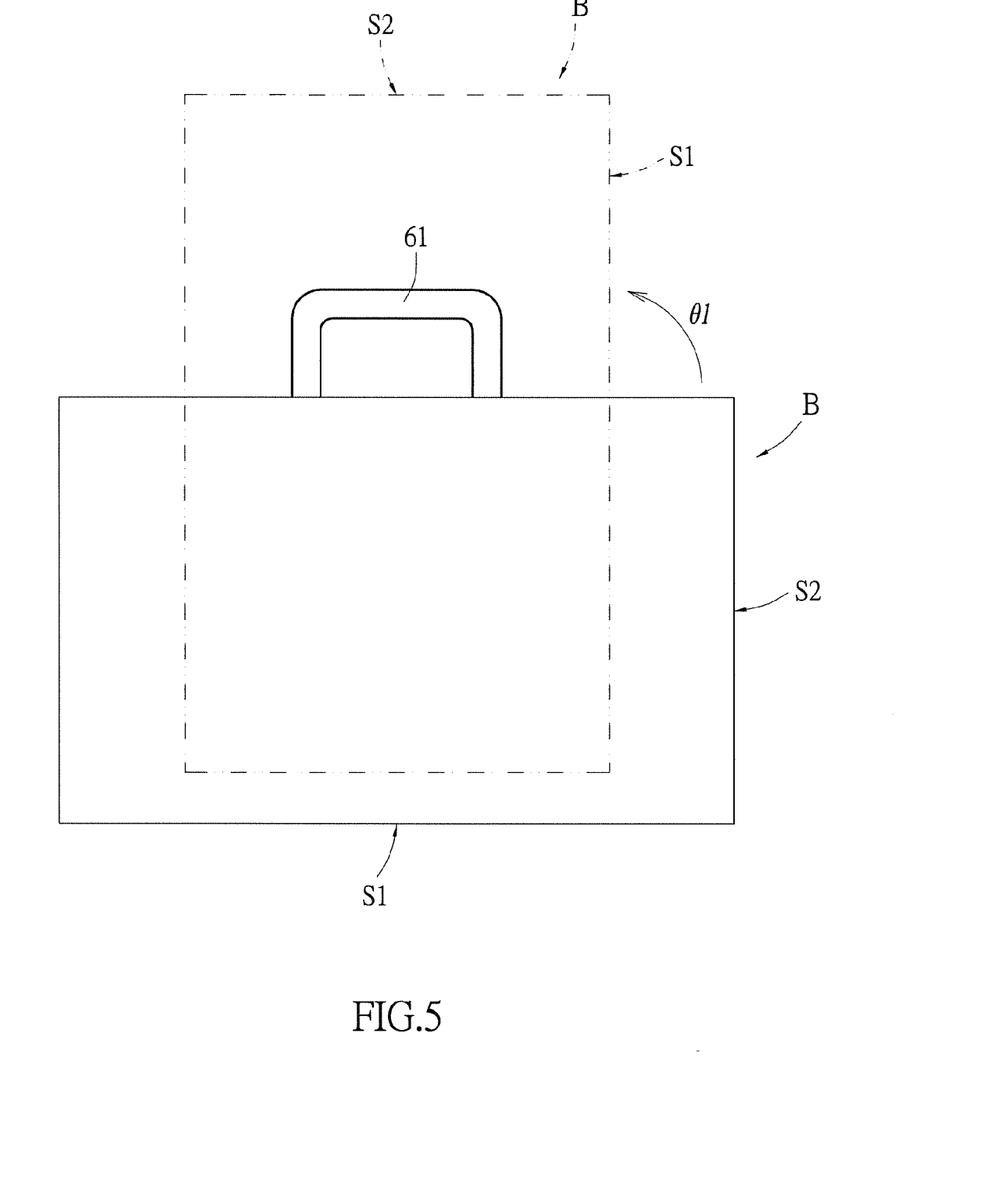
FIG. 5 is a top view of a frame stand changing states in accordance with an embodiment of the instant disclosure.

Subsequently, as shown in FIG. 5, the display panel B can steadily rotate till the first angle θ1 reaches 90 degrees while the stop 614 provides the corresponding friction and supporting. FIG. 5 is a top view of the frame stand switching states in accordance with the embodiment of the instant disclosure. Finally, the display panel B is lifted and either the first side S1 or second side S2 along with the supporting unit 61 rests on the working surface C. The second angle θ2 is also brought to a desired angle.

In other words, when the frame stand A switches between the first and second states, the second angle θ2 firstly turns 180 degrees and then the first angle θ1 turns 90 degrees. The second angle θ2 is finally adjusted to a suitable working angle and completing the process.

Moreover, the position of the board 10 relative to the display panel B is not restricted by the exemplary embodiment. The position of the board 10 on the display panel B can be adjusted to a preferable position according to the size of display panel B and the dimension of the supporting rack 60. When the frame stand A is in the first or second state, the projection of supporting member 612 on the display panel B is the perpendicular bisector of either the first side S1 or the second side S2. The arrangement evenly distributes the pressure from the display panel B. Typically, the display panel B is a rectangular tablet. Accordingly, the board 10 is mounted biased from the centre region of the display panel B to differentiate the first and second states.

In conclusion, the frame stand includes the interface plate, supporting rack, first, second shafts and guiding unit confining the rotating angle of the first shaft. The elements allow the display panel having two different upright orientations. Either side of the display panel can be used in cooperation with the frame stand and rest on the working surface. Hence, the frame stand is able to switch between two states and the manufacturing cost is minimized due to the simplified design. The instant disclosure provides both commercial and practical values.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A frame stand for supporting a display panel on a working surface, comprising:
    a board mounted on the back of the display panel;
    a first shaft connecting the board;
    an interface plate pivotally connecting the first shaft and rotating in parallel with respect to the board to form a first angle; and
    a frame supporting rack connecting the interface plate and having at least one supporting member and a second shaft coupled to one end of the supporting member, the supporting member being able to pivot a second angle by taking the second shaft as an axis, the second shaft being away or closer to the working surface as the second angle decreasing or increasing respectively;
    wherein the frame stand selectively switches between a first and a second states, in the first state, a first side of display panel and the supporting member rest on the working surface, while in the second state, a second side of display panel and the supporting member rest on the working surface;

wherein the frame stand comprises a guiding groove and a guiding member, the guiding groove is formed on the interface plate, and one end of the guiding member is connected to the board and the other end of the guiding member is inserted in the guiding groove, wherein upon the interface plate rotates the first angle in respect to the board, the guiding member goes along the guiding groove, and the guiding member is in a first position within the guiding groove in the first state whereas the guiding member is in a second position within the guiding groove in the second state.

2. The frame stand according to claim 1, wherein the guiding groove resembles a quarter-circular arc.

3. The frame stand according to claim 1 wherein the guiding member is a pin having a first end portion and a second end portion, the first end portion is relatively smaller in diameter than the second end portion, and the second end portion is inserted in the guiding groove.

4. The frame stand according to claim 1, wherein the supporting rack further includes a returning unit mounted on the interface plate and pivotally connecting the supporting member by the second shaft for providing a returning force to the supporting member in respect to the interface plate.

5. The frame stand according to claim 1, wherein the supporting rack further includes a stop coupled to one side of the supporting member and selectively contacting the working surface for providing friction.

6. The frame stand according to claim 5, wherein when the second shaft is at the closest position to the working surface, the display panel is parallel to the working surface.

7. The frame stand according to claim 1, wherein the board is mounted off center of the back of display panel.

8. The frame stand according to claim 1, wherein in the first state, the supporting member is trimming with the first side of display panel, while in the second state, the supporting member is trimming with the second side of display panel.

9. The frame stand according to claim 1, further comprising an auxiliary board sandwiched between the board and the interface plate by using the first shaft as a bolt and formed with slots on a surface thereof for lubricant deposition.

* * * * *